United States Patent [19]

Doppstadt

[11] Patent Number: 5,419,131
[45] Date of Patent: May 30, 1995

[54] MOBILE MACHINE CONTAINING DISPLACEABLY MOUNTED POWER UNIT OR POWER UNIT COMPONENTS

[76] Inventor: Werner Doppstadt, Vossnacker Strasse 67, 42555 Velbert, Germany

[21] Appl. No.: 215,275

[22] Filed: Mar. 21, 1994

[30] Foreign Application Priority Data

Apr. 20, 1993 [DE] Germany ................. 9305879 U

[51] Int. Cl.⁶ .................. F16D 31/02; B60K 5/10
[52] U.S. Cl. ..................... 60/458; 180/298; 280/769
[58] Field of Search ............. 60/458, 325; 180/298, 180/295; 280/769

[56] References Cited

U.S. PATENT DOCUMENTS

| | | | |
|---|---|---|---|
| 4,169,580 | 10/1979 | Hatlapa et al. | 60/458 X |
| 4,535,867 | 8/1985 | Botar | 180/298 X |
| 4,770,440 | 9/1988 | Lander | 280/769 X |
| 4,927,528 | 5/1990 | Doppstadt . | |
| 5,018,651 | 5/1991 | Hull et al. | 280/769 X |
| 5,137,108 | 8/1992 | Knowlton et al. | 180/298 |
| 5,251,721 | 10/1993 | Ortenheim | 180/298 |

Primary Examiner—Edward K. Look
Assistant Examiner—Hoang Nguyen
Attorney, Agent, or Firm—Collard & Roe

[57] ABSTRACT

The mobile machine is provided with a power unit containing a prime mover and a hydraulic system connected thereto for supplying power to hydraulically operated machine parts. The power unit includes a number of components and is mounted at a support frame. Either the entire power unit as such or selected ones of its components are arranged for displacement between a first or operative position and a second or displaced position in which free access is provided to the power unit as such or its selected components for maintenance and/or repair operations. Also, those parts of the machine, which are hidden behind the power unit or its selected components in their first or operative position, become accessible in the second or displaced position of the power unit or selected components thereof.

13 Claims, 3 Drawing Sheets

MOBILE MACHINE CONTAINING DISPLACEABLY MOUNTED POWER UNIT OR POWER UNIT COMPONENTS

CROSS-REFERENCE TO RELATED APPLICATION

This application is related to my copending U.S. application Ser. No. 08/215,326, filed Mar. 21, 1994, entitled "Mobile Material Processing Machine With Tandem Axle".

BACKGROUND OF THE INVENTION

The invention relates to a new and improved construction of a mobile machine containing a power unit.

In a mobile processing machine such as known, for example, from U.S. Pat. No. 4,927,528, granted May 22, 1990, to the applicant of the instant application, the processing machine constitutes a rotatable sieve device for separating compost from comminuted waste material, which has been deposited in stacks or pits, after completion of a rotting process. The sieve device has associated therewith a number of conveyors for taking up and conveying the different materials resulting from the sieving operation. The sieve device as well as the conveyors associated therewith are mounted at a common support frame which also supports the power unit. The power unit includes a diesel engine as a prime mover drivingly connected to a sieve drum and a hydraulic system which drivingly acts upon the conveyors and other hydraulically operated parts of the sieve device.

The aforementioned power unit of the mobile waste processing machine has been recited merely as an example of widely used power units of such type. Multi-component power units of this kind are generally employed in various fields in connection with a variety of mobile machines which are operated, like the aforenoted material processing machine, in a basically comparable manner and comparable environmental conditions.

In many cases like in the aforementioned specific case, the power unit is placed on the support frame in a position in which the power unit as a whole or certain components thereof are accessible essentially only from one side. Also, parts of the machines driven by such power unit are covered or hidden by the power unit or certain components thereof and thus become inaccessible. However, in a great number of cases mobile machines of this type are utilized in places and environments which are way distant from a workshop or any other place permitting the power unit and/or machine parts hidden thereby to be readily accessed for maintenance and/or repair work.

Thus, with the presently known constructions of mobile machines, the severely restricted accessibility of either the power unit or certain components thereof and the machine parts hidden by the power unit or its components poses a serious problem if maintenance and/or repair operations become required.

SUMMARY OF THE INVENTION

Therefore, with the foregoing in mind, it is a primary object of the present invention to provide a new and improved construction of a mobile machine which is not afflicted with the drawbacks and limitations of the prior art heretofore discussed.

Another and more specific object of the present invention is directed to a new and improved construction of a mobile machine in which access is provided to the power unit of the mobile machine in the event that maintenance and/or repair thereof are required.

It is an important object of the present invention to provide a new and improved construction of a mobile machine in which access is provided to selected components of the power unit in the event that maintenance and/or repair are required for such selected components.

A further important object of the present invention is directed to a new and improved construction of a mobile machine in which access is provided to machine parts which are covered or hidden by the power unit or selected components thereof, in order to permit maintenance and/or repair of such machine parts.

It is a further significant object of the present invention to provide a new and improved construction of a mobile machine in which either the power unit or selected components thereof are permitted to be displaced into a position for ready access thereto.

Now, in order to implement these and still further objects of the invention, which will become more apparent as the description proceeds, the mobile machine of the present development is manifested by the features that, among other things, selectively either the power unit or at least one selected component thereof is displaceably supported at the mobile machine for displacement between a first or operative position and a second or displaced position permitting ready access to selectively either the power unit as a whole, the selected component thereof or a machine part which is hidden behind the power unit or its selected component in their first or operative position.

In an advantageous development of the inventive construction, the power unit may be mounted at a platform which is supported at a support frame for pivotation about a substantially vertical axis by up to nearly 180°. In such case, the platform may be generally rectangularly shaped and pivotably supported at the support frame for pivoting about a pivot pin which is placed at an external corner of the platform in the operative or non-pivoted position of the platform.

In a preferred embodiment of the inventive construction the aforenoted selected component of the power unit may constitute a cooler which is arranged at the power unit for pivoting about a laterally disposed pivot axis. The cooler may constitute a cooler for hydraulic oil supplied to a hydraulic drive system by means of a pump operated under the action of the power unit. Alternatively, when the prime mover of the power unit constitutes a water-cooled diesel engine or the like, the cooler may constitute a water cooler through which the cooling water for the combustion engine is passed.

In a further development of the inventive construction, the aforenoted selected component of the power unit may constitute an oil reservoir of a hydraulic system. The pumps of such hydraulic system are located below the oil reservoir and connected therewith through flexible lines; the oil reservoir is arranged to be laterally pivoted away about a substantially horizontally extending pivot axis such as to provide access to the hydraulic system or the pumps thereof.

BRIEF DESCRIPTION OF THE DRAWINGS

The invention will be better understood and objects other than those set forth above will become apparent when consideration is given to the following detailed description thereof. Such description makes reference to the annexed drawings wherein the same or analogous components are designated by the same reference characters and wherein.

DETAILED DESCRIPTION OF THE PREFERRED EMBODIMENTS

Describing now the drawings, it is to be understood that only enough of the construction of the power unit in connection with a mobile machine has been shown as needed for those skilled in the art to readily understand the underlying principles and concepts of the present development, while simplifying the showing of the drawings. It will also be understood that the same or analogous features are generally utilized in connection with mobile machines of the most variable types and substantially independent of the specific purpose of use of such machine, particularly in connection with machines which tend to be deployed in environments which are not readily accessible and materially distant from any workshop or other installation at which maintenance and/or repair operations can be readily carried out, if required.

Figure 1:
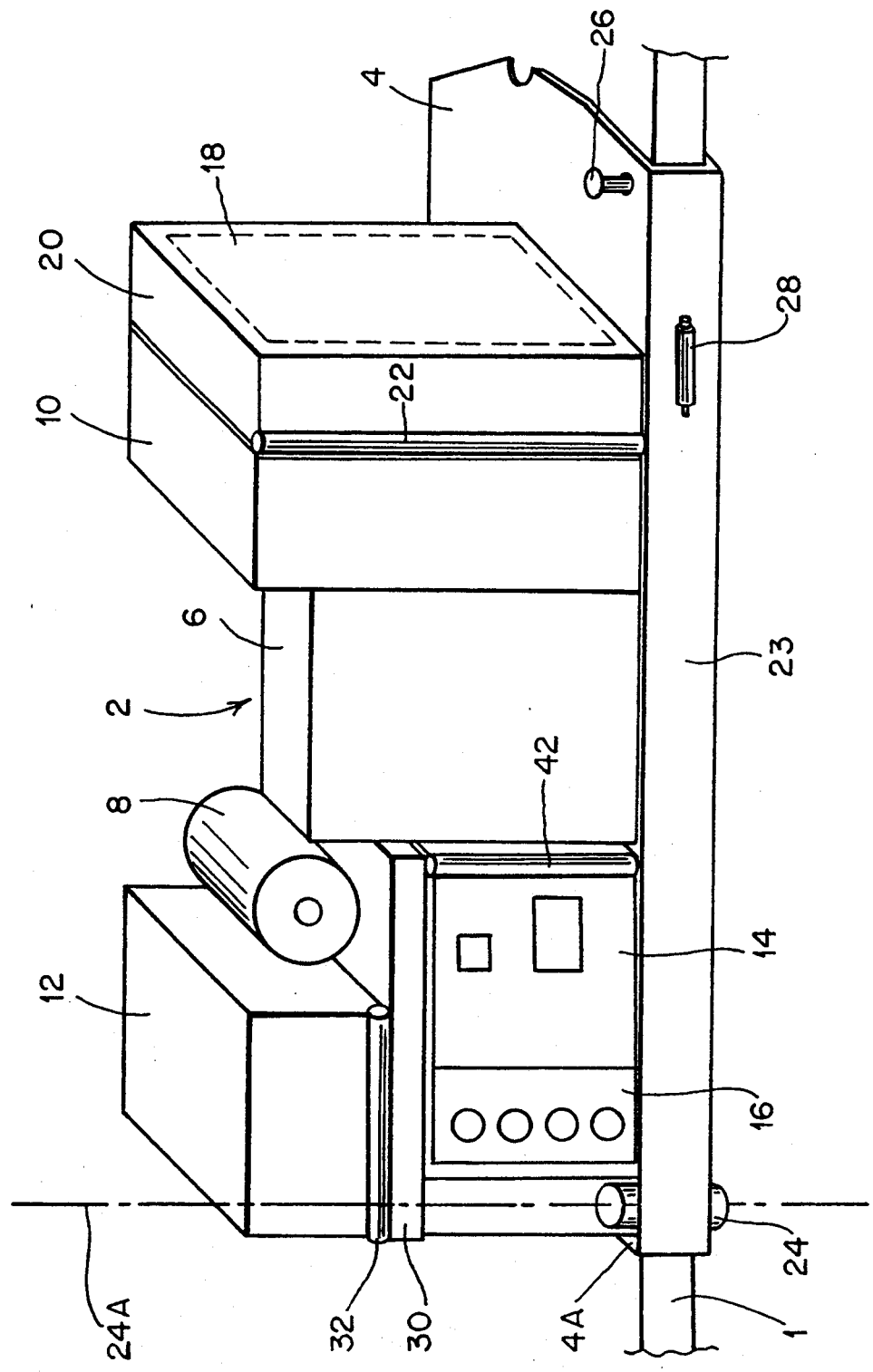
FIG. 1 is a schematic illustration in perspective of a first exemplary embodiment of the inventive construction in which a power unit is mounted at a pivotable platform.
Figure 2:
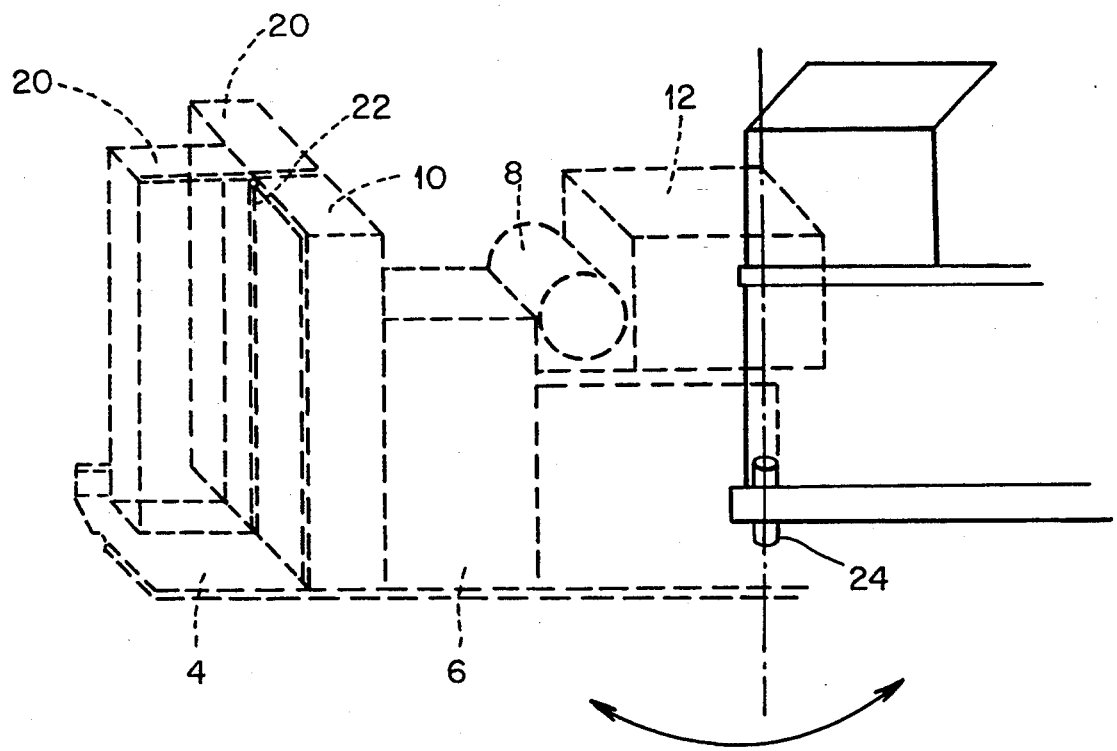
FIG. 2 schematically shows part of the platform inclusive of the power unit as illustrated in FIG. 1 and, in broken lines, the platform inclusive of the power unit and selected components thereof in a pivoted position.
Figure 3:
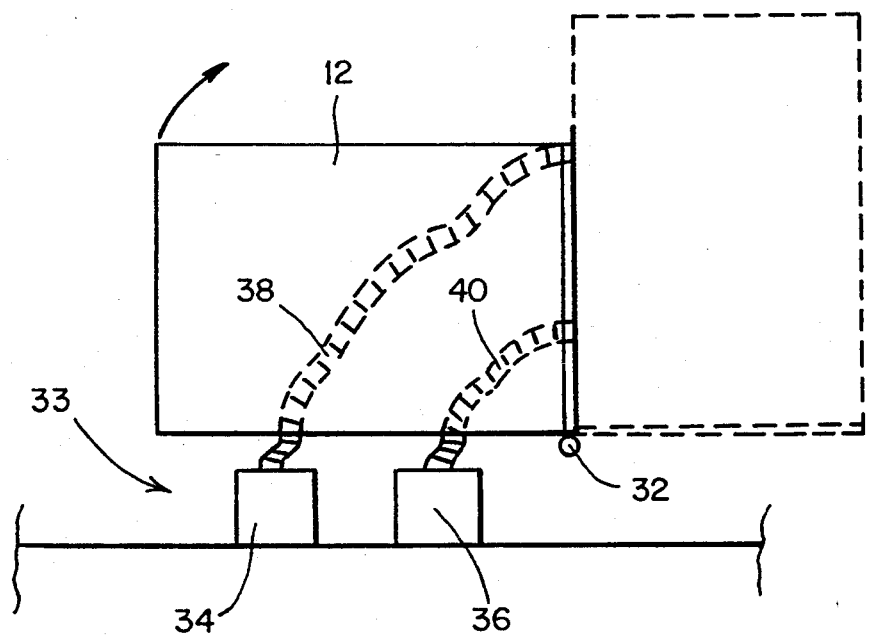
FIG. 3 schematically shows an oil reservoir and hydraulic pumps connected to and arranged below the oil reservoir of a hydraulic system in the power unit as shown in FIGS. 1 and 2 and, in broken lines, a pivoted-away position of the oil reservoir.

The first exemplary embodiment of the inventive construction, which is schematically illustrated in FIGS. 1 to 3, relates to a mobile material processing machine containing, for example, a sieve device and associated components (not illustrated) of the type as disclosed in the initially mentioned U.S. Pat. No. 4,927,528. Such mobile material processing machine includes a support frame 1 which is only schematically indicated and which supports the sieve device and its parts and a power unit 2 powering the sieve device and its parts.

The power unit 2 is placed on mounting means in the form of a platform 4 which is disposed at the support frame 1 laterally of the sieve device. The power unit 2 includes a prime mover 6 which in most cases will constitute a water-cooled diesel engine but may also constitute an electric motor where electric power is available. An air filter 8 of conventional construction is connected to the inlet side of the prime mover or diesel engine 6. A water cooler 10 is located on one side of the power unit 2 and associated with a ventilator driven by the diesel engine 6. On the side remote from the water cooler 10, a conventional hydraulic system (not illustrated) is disposed and contains, inter alia, a main pump like, for example, an axial piston pump which is in driven connection with the diesel engine 6. The hydraulic system further includes a plurality of hydraulic pumps for supplying hydraulic oil to the various hydraulically operated parts of the machine like the aforementioned sieve device. These components of the power unit 2 are arranged below an oil reservoir 12 and behind a front panel 14 which includes an indicating and operating section 16 on the left of the diesel engine 6 as shown in FIG. 1.

Furthermore, and as shown on the right in FIG. 1, an oil cooler 18 is located on the outer right-hand side of the water cooler 10 and communicates with the aforementioned hydraulic system. Basically, the oil cooler 18 is housed in a frame 20 which is made of perforated sheet metal. As a consequence, the cooling air flow generated during operation of the diesel engine 6, will first pass and act upon the oil cooler 18 and thereafter the water cooler 10. The water cooler 10 and the frame 20 of the oil cooler 18 are connected by means of a hinge connection 22 which extends along one edge of the frame 20 substantially perpendicular to the platform 4.

As shown in FIG. 1, the mounting means or platform 4 is of substantially rectangular shape and defines an outward facing side 23 which extends around part of a lateral member of the support frame 1. In the region 4A of a front left-hand corner, as viewed in FIG. 1, the platform 4 is displaceably supported at the support frame 1 by displacing means in the form of pivot means containing a pivot pin 24 which defines a pivot axis 24A. In the region of a front right-hand corner, as viewed in FIG. 1, the platform 4 is secured by a linch pin 26 or the like in a position in which the power unit 2 assumes a first or operative position.

The displacing or pivot means 24,28 are provided for manually pivoting the platform 4 inclusive of the power unit 2 after removing the linch pin 26. The pivot means include a handle 28 on the outward facing side 23 of the platform 4 and permit a pivot angle up to nearly 180° about the pivot pin 24 in the direction towards the viewer in FIG. 1. As shown in FIG. 2 in broken lines, in the pivoted position of the platform 4, the power unit 2 assumes a second position in which it is pivoted away from the support frame 1. The solid lines in FIG. 2 show part of the platform 4 and part of the power unit 2 in the first or operative position.

In the second or pivoted position illustrated in FIG. 2, the power unit 2 is accessible substantially from all sides for, for instance, maintenance and/or repair operations. Furthermore, also those parts of the sieve device and the associated components, which are hidden behind the power unit 2 when the same is in its first or operative position shown in FIG. 1, are now accessible without taking recourse to any complicated and undesirable dismounting or disassembling operations. As a result, such maintenance and/or repair operations are tremendously facilitated and accelerated as a further consequence. It should be noted in this context that the mobile machines of the type referred to frequently operate under comparatively unfavorable environmental conditions and also at unfavorably distant locations.

The displacing or pivoting movement is not restricted to displacing or pivoting the entire power unit 2 but may also be carried out on selected components thereof independently of the displacement or pivotation of the power unit 2 as a whole. As shown in FIG. 1, the selected component can be the frame 20 containing the oil cooler 18 which is connected to an associated section or component of the power unit 2, namely the water cooler 10. Specifically, the connection is effected by displacing or pivot means in the form of the hinge connection 22. The hinge connection 22 defines a pivot axis which extends, in the illustrated embodiment, substantially perpendicular to the platform 4. Due to the hinge connection 22, the frame 20 and thereby the oil cooler 18 can be pivoted from a first or operative position as shown in FIG. 1 to a second or pivoted position through 90°, as shown by broken lines in FIG. 2, up to 180°, as shown in dash-dotted lines in FIG. 2. Ready access to the oil cooler 18 and the associated section of the power unit 2, namely the water cooler 10, is thereby provided.

As further shown in FIGS. 1 and 3, the selected component can be the oil reservoir 12 which has an associated section 33 of the power unit. This associated section 33 accommodates parts of the hydraulic system such as oil pumps 34 and 36. The section 33 is bounded by a structural element 30 to which the oil reservoir is connected by displacing or pivot means in the form of a hinge connection 32. The hinge connection 32 defines a pivot axis which extends substantially parallel to the platform 4 and, in the illustrated embodiment, substantially parallel to the outward facing side 23 of the platform 4. Due to the hinge connection 32, the oil reservoir 12 can be pivoted from a first or operative position shown in FIG. 1, to a second or pivoted position shown in broken lines in FIG. 3. Ready access to the oil reservoir and to the associated section 33 and the oil pumps 34,36 is thereby provided. In order to maintain communication with the oil reservoir 12 during pivotation and in the second or pivoted position, the oil pumps 34,36 are connected thereto through respective flexible lines or conduits 38 and 40.

In the illustrated embodiment, the oil reservoir 12 is mounted on top of the associated section 33. It will be appreciated that the oil reservoir 12 can be placed at different locations. In any location, the access to the associated section 33 in the second or pivoted position of the oil reservoir 12 can be retained by appropriately arranging the hinge connection 32.

As further indicated in FIG. 1, the selected component can be the front panel 14 of the power unit 2. The associated section of the power unit 2, then, is again the section 33 which accommodates parts of the hydraulic system such as the oil pumps 34,36. The front panel 14 is connected to displacing or pivot means in the form of a hinge connection 42. The hinge connection 42 defines a pivot axis which extends substantially perpendicular to the platform 4 between the platform 4 and the structural element 30. Due to the hinge connection 42, the front panel 14 can be pivoted from a first or operative position shown in FIG. 1 to a second or pivoted position in which ready access is provided to the rear side of the front panel 14, the associated section 33 and the oil pumps 34,36 accommodated thereby.

It should be noted that the arrangement is such that the power unit 2 is operable and thus can be checked and tested in practically all of its displaced or pivoted positions as well as in practically all of the displaced or pivoted positions of its selected components.

It will also be appreciated that the selected components, if required, can be retained in their first or operative position by respective retaining members which preferably can be constructed in the manner of conventional snap or locking members.

Also, not all of the aforenoted displacing or pivoting features need necessarily be present in a mobile machine. Depending upon prevailing structural conditions, for example, the power unit may be accessible as such in the operative position so that no displacement or pivotation is required in connection with maintenance and/or repair operations. Still, individual ones of the aforementionned selected components may require to be displaced or pivoted for providing ready access thereto and to associated sections of the power unit 2.

Figure 4:
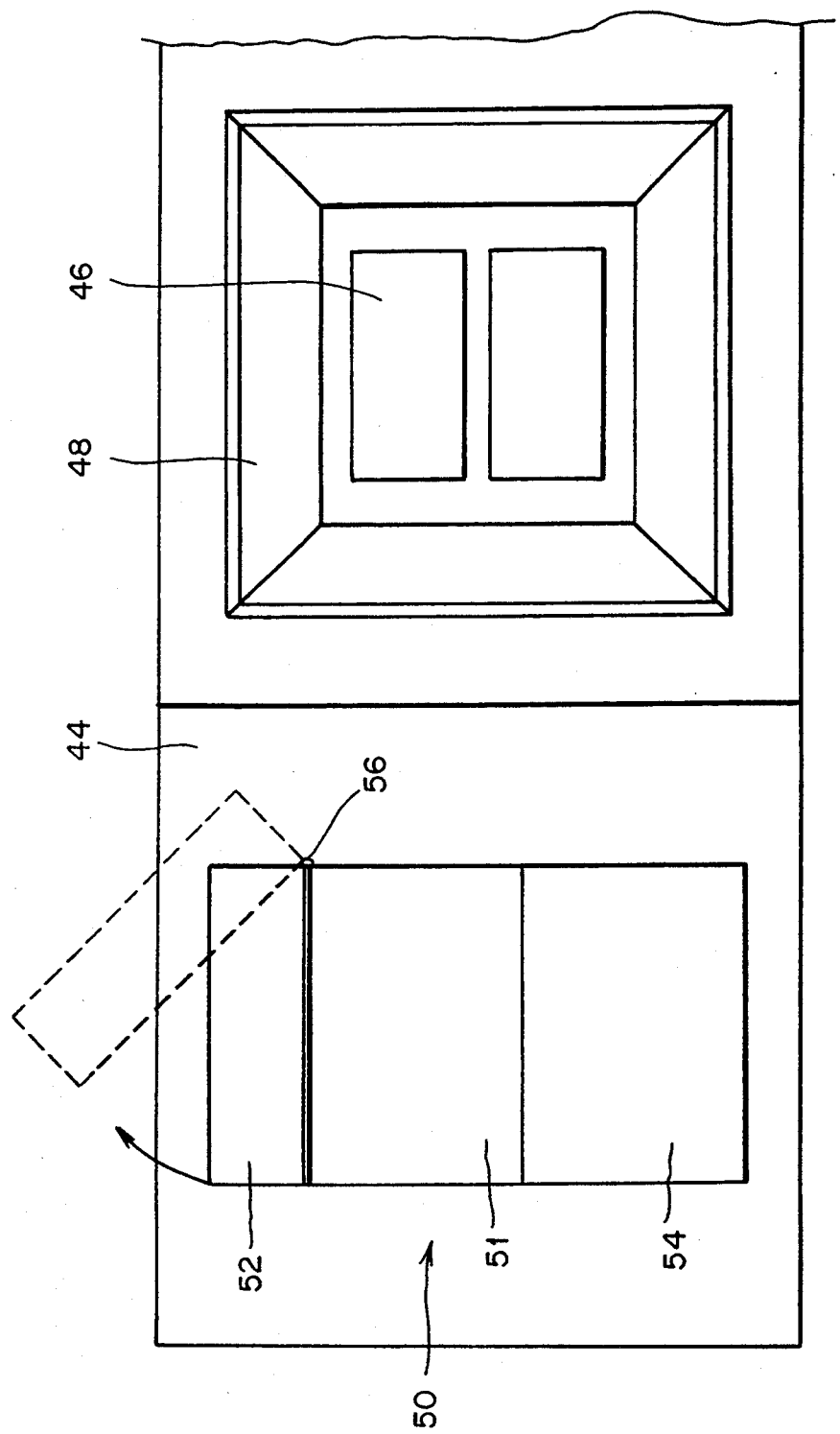
FIG. 4 schematically shows a top plan view of a second exemplary embodiment of the inventive construction in which the power unit of a mobile comminuting machine contains a laterally disposed cooler.

The aforenoted aspect of the invention will become apparent upon considering a second exemplary embodiment of the invention which is schematically illustrated in FIG. 4. As shown therein by solid lines, a support frame 44 of a mobile machine supports a conventional two-shaft breaking or crushing machine 46 inclusive of an infeed hopper 48. The support frame 44 also supports a conventional power unit 50 of the aforementioned type including a prime mover 51 and a hydraulic system 54. The power unit 50 is accessible from three sides and, therefore, does not need to be displaceably mounted at the support frame 44. The prime mover 51 of the power unit 50 is a water-cooled diesel engine provided with a water cooler 52. The water cooler 52 is connected to the prime mover 51 by displacing or pivot means in the form of a hinge connection 56. The hinge connection 56 defines a pivot axis which extends substantially perpendicular to the support frame 44. Due to the hinge connection 56, the water cooler 52 can be pivoted from a first or operative position shown by solid lines in FIG. 4, to a second or pivoted position shown by broken lines in FIG. 4. Ready access to the water cooler 52 and the associated section of the power unit 50 is thereby provided.

In this embodiment, an oil cooler (not shown) which communicates with the hydraulic system 54, is placed at a location separate from the power unit 50. However, if desired, the oil cooler may also be mounted at the hydraulic system 54 and, then, may be mounted thereat in a displaceable or pivotable manner.

The aforedescribed embodiments relate to mobile machines meaning that these machines are mounted on conventional mobile support structures which can be displaced at a given working location or travel to different working locations by means of a towing vehicle like a tractor or truck. The support structure may constitute a support frame which, in turn, is mounted at a wheel-supported undercarriage. Preferably, the undercarriage is part of a tandem axle provided with hydraulically operated drive means for displacing the mobile machine at a given working location and the support frame and the undercarriage are lengthwisely adjustable relative to each other for adjusting the load effective at the towing vehicle to a predetermined value, as described in the cross-referenced copending U.S. patent application Ser. No. 08/215,326, filed Mar. 21, 1994.

While there are shown and described present preferred embodiments of the invention, it is to be distinctly understood that the invention is not limited thereto but may be otherwise variously embodied and practiced within the scope of the following claims wherein:

What I claim is:

1. A mobile machine comprising;
   a power unit containing a plural number of components and connected to a mobile material processing machine for operating said mobile material processing machine;
   a mobile support frame supporting said mobile material processing machine and said power unit;
   mounting means for displaceably mounting said power unit at said support frame;

said mounting means including a platform which extends substantially parallel to said mobile support frame and which has mounted thereat said power unit;

pivot means pivotably connecting a corner region of said platform to said mobile support frame for pivotation about a pivot axis extending substantially perpendicular to said platform and said mobile support frame; and said pivot means pivoting said platform between a first position, in which said power unit assumes a first, operative position for operating said mobile material processing machine, and a second position, in which said power unit assumes a second, pivoted position wherein said power unit and substantially all of said plural number of components are readily accessible from substantially all sides.

2. The mobile machine as defined in claim 1, wherein:
said mobile material processing machine comprises a machine part;
said machine part being hidden behind said power unit in said first position of said power unit; and
said machine part being accessible in said second position of said power unit.

3. The mobile machine as defined in claim 1, wherein:
said platform is of substantially rectangular shape and defines an outward facing side in said first position of said power unit;
said pivot means containing a pivot pin defining said pivot axis; and
said pivot pin being located in said corner region of said platform close to said outward facing side of said platform.

4. The mobile machine as defined in claim 1, wherein:
said power unit contains at least one selected component from said plural components;
said at least one selected component being pivotably connected to said power unit;
pivot means defining a pivot axis and pivotably interconnecting said at least one selected component and an associated section of said power unit; and
said pivot means permitting pivoting said at least one selected component between a first, operative position and a second, pivoted position in which ready access is provided to said at least one component and said associated section of said power unit.

5. The mobile machine as defined in claim 4, wherein:
said power unit includes a prime mover and a hydraulic system in driven connection with said prime mover;
said at least one selected component of said power unit is an oil cooler communicating with said hydraulic system; and
said associated section of said power unit is a water cooler connected with said prime mover of said power unit.

6. The mobile machine as defined in claim 4, wherein:
said power unit includes a hydraulic system containing at least one oil pump and an oil reservoir;
said at least one selected component is said oil reservoir;
said associated section of said power unit accommodates said at least one oil pump; and
flexible lines interconnecting said at least one oil pump and said oil reservoir.

7. The mobile machine as defined in claims 6, wherein:
said oil reservoir is disposed above said associated section accommodating said at least one oil pump.

8. The mobile machine as defined in claim 4, wherein:
said power unit includes a hydraulic system containing at least one oil pump;
said at least one selected component is a front panel; and
said associated section of said power unit accommodating said at least one oil pump.

9. A mobile machine comprising:
a power unit drivingly connected to a machine;
a mobile support frame supporting said power unit and said machine;
said power unit containing a cooler;
said cooler being located on one side of said power unit;
pivot means for pivoting said cooler about a pivot axis extending along said one side of said power unit; and
said pivot means pivoting said cooler between a first position, in which said cooler is in an operative position on said one side of said power unit, and a second position in which said cooler is pivoted away from said one side of said power unit for ready access.

10. The mobile machine as defined in claim 9, wherein:
said power unit includes a prime mover;
said prime mover includes a water-cooled combustion engine; and
said cooler constituting a water cooler for cooling said combustion engine.

11. The mobile machine as defined in claim 9, wherein:
said power unit includes a hydraulic system for driving hydraulically operated parts of said machine;
said cooler constituting an oil cooler communicating with said hydraulic system.

12. A mobile machine comprising:
a power unit including a hydraulic system drivingly connected to hydraulically operated parts of a machine;
a mobile support frame supporting said power unit, said hydraulic system and said machine;
said hydraulic system containing an oil reservoir and at least one oil pump;
a section of said power unit associated with said oil reservoir and accommodating said at least one oil pump;
flexible lines communicating said oil reservoir and said at least one oil pump;
said oil reservoir being pivotably mounted at said power unit;
pivot means defining a pivot axis; and
said pivot means pivoting said oil reservoir about said pivot axis between a first position, in which said oil reservoir is in an operative position and blocks access to said at least one oil pump, and a second position in which said oil reservoir is pivoted away from said associated section and provides ready access to said at least one oil pump.

13. The mobile machine as defined in claim 12, wherein:
said oil reservoir is disposed above said associated section of said power unit;
said pivot axis defined by said pivot means, extending parallel to said support frame; and
said oil reservoir, in said second position thereof, being pivoted laterally away from said associated section of said power unit.

* * * * *